United States Patent
Picco et al.

(10) Patent No.: US 6,554,245 B2
(45) Date of Patent: *Apr. 29, 2003

(54) MARKING DEVICE FOR A MOULD

(76) Inventors: Bernard Picco, Ijean, F-01870 Groissiat (FR); Patrick Picco, 5, rue Vaucher, F-01100 Oyonnax (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,662

(22) PCT Filed: Jul. 10, 1997

(86) PCT No.: PCT/FR97/01269

§ 371 (c)(1), (2), (4) Date: Jun. 1, 1999

(87) PCT Pub. No.: WO98/02292

PCT Pub. Date: Jan. 22, 1998

(65) Prior Publication Data

US 2002/0023998 A1 Feb. 28, 2002

(30) Foreign Application Priority Data

Jul. 16, 1996 (FR) ............................................. 96 09135

(51) Int. Cl.[7] ................................................. B29C 33/42
(52) U.S. Cl. ................... 249/103; 425/190; 425/192 R; 249/53 R
(58) Field of Search .............................. 249/53 R, 102, 249/103, 104, 155; 425/190, 192 R

(56) References Cited

U.S. PATENT DOCUMENTS

| 4,137,962 | A | * | 2/1979 | Pol | 425/169 |
| 4,384,702 | A | * | 5/1983 | Boskovic | 249/103 |
| 4,708,314 | A | * | 11/1987 | Kuhling | 249/103 |
| 5,038,504 | A | * | 8/1991 | Modigh | 249/103 |
| 5,620,716 | A | * | 4/1997 | Opitiz | 249/53 R |
| 5,788,872 | A | * | 8/1998 | Uratani | 249/103 |
| 5,902,512 | A | * | 5/1999 | Streit | 249/103 |
| 6,050,803 | A | * | 4/2000 | Omura et al. | 249/103 |

FOREIGN PATENT DOCUMENTS

AU   WO 89/02831   *   4/1989

* cited by examiner

Primary Examiner—Robert Davis
Assistant Examiner—Thu Khanh T. Nguyen
(74) Attorney, Agent, or Firm—Oliff & Berridge, PLC

(57) ABSTRACT

The invention discloses a marking device for a mould having a housing in a wall. The device includes a threaded cylindrical body and a circular head of a diameter about equal to the diameter of the housing. A face of the head opposite to the body includes structure that turns the head and a marking distinct from the structure and independent from the position of the structure. A length of the body and head are less than the length of the housing in the mould in order that the face with the marking lies flush with the internal face of the wall of the mould when the device is in the housing.

4 Claims, 1 Drawing Sheet

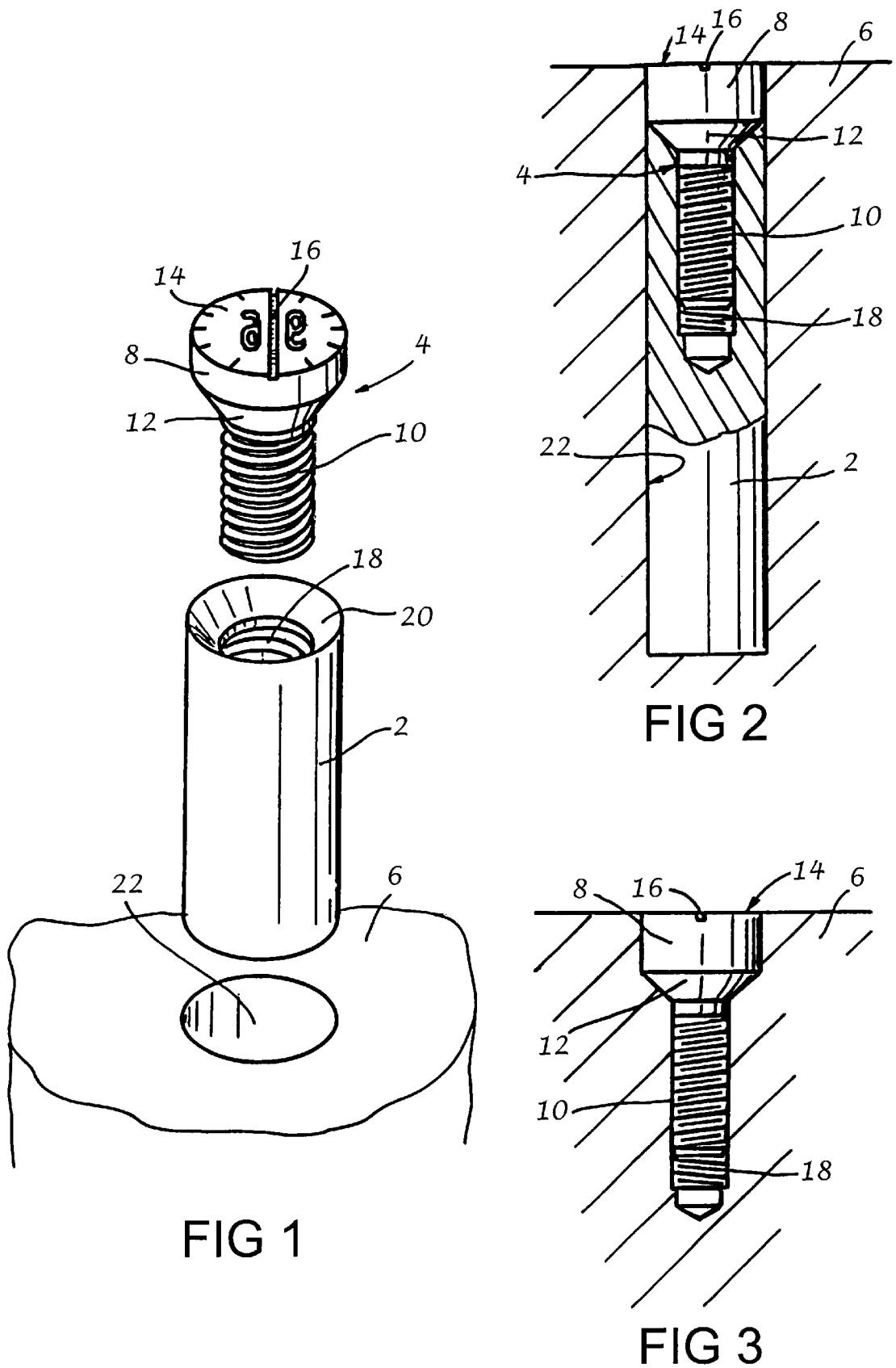

MARKING DEVICE FOR A MOULD

The subject of the present invention is a marking device for a mould, for injection or press moulding of parts made of synthetic substances or pressure die-cast parts.

This invention relates to the moulding of parts which need to be identified, particularly by a date of manufacture. To do this, a device is positioned in the mould.

There are in existence inserts which comprise a number of parts, which can move with respect to each other. By altering the relative position of two parts, it is possible to alter the marking to be made on the part. Thus, for example, a first part on which there is engraved an arrow and the indication of a year can rotate in an annular part bearing the numbers 1 to 12. By rotating the part placed on the inside, the arrow can point to one of the numbers engraved on the outer part. This makes it possible to indicate the month of manufacture on parts made in a mould fitted with such a marking device.

To reduce the cost of a mould, there are also marking devices which consist of just one part positioned in the mould. This part is, for example, a cylindrical part placed in a housing of a complementary shape. This part, generally of circular cross section, is fitted tightly in its housing, in order to prevent any relative movement between the marking device and the wall of the mould.

However, these marking devices bear an indication that the manufacturer may need to modify. This may, for example, be the indication of a year, or a symbol liable to change (product mark, customer reference, etc.).

The drawback of these marking devices is that it is difficult to change them. They are not easy to remove and this removal generally leads to damage preventing the marking device from being reused, or even destroying it. Indeed it is not uncommon for it to be necessary to make a hole in the marking device in order to be able to extract it from its housing.

This takes a great deal of time. Furthermore, when a hole is drilled, chips are produced and these run the risk of falling into the mould. Finally, there is the risk of damaging the mould.

Document JP 63 013 724 describes a method for indicating a date of moulding on a part made of synthetic material in a mould. This method consists of using a mould which has moulding dates and two different types of screws, and then placing a predetermined type of screw opposite a part of the mould corresponding to the date that is to be shown.

The object of the invention is therefore to provide a simple marking device intended to have a fixed position in a mould, but which can be readily removed and refitted.

To this end, it proposes a marking device which comprises:
- a head intended to lie flush with the internal face of the wall of the mould, that face of the head that faces towards the inside of the mould having a marking and means allowing the head to be turned,
- a threaded cylindrical body forming a single piece with the head of the device.

This marking device can be screwed directly into the interior wall of the mould, such that the head lies flush with this wall. The wall of the mould then has a tapped hole, the shape of which corresponds to the shape of the device. To change the marking made on the parts manufactured in the mould, all that is required is for the marking device to be unscrewed and another marking device of the same shape but with the desired marking to be screwed back in in its place.

If the wall of the mould already has a housing for housing a marking device, it is possible to insert into this housing a part which matches the shape thereof, and to make in this intermediate part a tapped hole to allow the marking device according to the invention to be housed.

Advantageously, the marking device has a head of circular cylindrical shape, with an outside diameter that is greater than the outside diameter of the body. It is then possible to achieve a tight fit between the head of the marking device and the wall of the mould, at the peripheral surface of the head.

In this last instance, a part of frustoconical shape preferably connects the head of the device to its body, so as to obtain a better fit of the device in its housing.

In instances where the wall of the mould does not have a tapped hole, but only has a housing of circular cylindrical shape, the marking device further comprises a tapped bush, the outside diameter of which corresponds to the outside diameter of the head of the device, and the tapping of which corresponds to the screw thread of its body, so that when the body is screwed into the bush, the entity thus formed is of circular cylindrical shape. This assembly can then sit in the wall of the mould. Of course, the outside diameter of the bush and of the head will be adapted to suit the inside diameter of the housing in the wall of the mould.

For the marking devices according to the invention and described hereinabove, the means for turning the head are advantageously a straight slot passing through the centre of that face that faces towards the inside of the mould. However, it may be any other means such as, for example, a hexagonal cylindrical recess or a square shape in relief.

In any case, the invention will be clearly understood from the description which follows, with reference to the appended diagrammatic drawing which depicts, by way of non-limiting examples, two embodiments of a marking device according to the invention.

FIG. 1 is a view in exploded perspective of a first marking device and of part of the mould housing this device, FIG. 2 is a view in longitudinal section of this first device and FIG. 3 is a view in section, corresponding to FIG. 2, of a second marking device.

A marking device consisting of two parts, a bush 2 and an insert 4, is depicted in section in its position in which it is fitted in a wall of a mould 6, in FIG. 2.

The insert 4 has a head 8 and a body 10 connected by a connecting region 12.

The head 8 is of circular cylindrical shape. It has a face 14 intended to lie flush with the internal face of the wall of the mould 6. This face has an indication, which may be recessed or in relief. As suggested by FIG. 1, this indication may correspond to the year of manufacture of the parts manufactured in the mould. It may of course be any other indication. This face 14 also has a slot 16 extending right across a diameter of the face 14. This slot 16 is intended to take the end of a screwdriver (not depicted).

The body 10 is also of circular cylindrical shape. The body 10 and the head 8 are coaxial. The body 10 is threaded over its entire length. Its outside diameter is smaller than the outside diameter of the head 8 of the insert.

The connecting region 12 is frustoconical. It connects, widening as it does so, the body 10 to the head 8 of the insert.

The bush 2 is of circular cylindrical shape. It has a tapped hole 18. The tapping of this hole corresponds to the screw thread of the body 10 of the insert. The outside diameter of the bush 2 is essentially equal to the outside diameter of the head 8 of the insert. At the same end as the open end of the tapped hole 18, the bush has a conical surface 20 extending from the outside free edge of the bush inwards. This conical surface corresponds to the cone angle of the connecting region 12 of the insert.

Thus, when the insert body is screwed into the tapped hole, the connecting region 12 comes to rest against the conical surface 20. The assembly formed by the insert 4 and the bush 2 is of circular cylindrical shape. The peripheral surface of the head 8 of the insert extends the peripheral surface of the bush 2 (FIG. 2).

This assembly formed by the bush 2 and the insert 4 is intended to lie in a circular cylindrical housing 22 formed in the wall of the mould 6. This assembly is tightly fitted into the housing 22. The tight fit allows the bush 2 and the insert 4 to be held in place. However, it is possible to unscrew the insert 4 from the bush 2. The height of the head 8 is relatively small, which means that the tight clamping exerted on the head 8 does not prevent the insert from being unscrewed.

Thus it is easy to change the marking on the parts manufactured in the mould 6. All that is required is for the insert 4 in place in the bush 2 to be unscrewed so that it can be replaced by another insert, of identical shape but exhibiting different markings.

FIG. 3 depicts an alternative form. In this alternative, there is the same insert 4 as there was in the embodiment described above, but the bush 2 has disappeared.

The housing made in the wall of the mould is different. It is no longer a circular cylindrical hole, but a stepped hole, part of which is tapped.

Starting from the inner part of the mould, the housing has a circular cylindrical part, the height and diameter of which correspond to the height and diameter of the head 8 of the insert. The housing then narrows and has a frustoconical surface corresponding to the connecting region 12. Finally, the blind end of the housing is tapped and the tapping corresponds to the screw thread on the body 10 of the insert.

When the insert 4 is fitted into the housing, its head 8 lies flush with the internal face of the wall of the mould. As was the case when the insert was mounted in a bush, the conical connecting surface allows the insert to position itself correctly and be a good fit.

As goes without saying, the invention is not restricted to the embodiments described hereinabove by way of non-limiting examples; on the contrary, it encompasses all alternative forms thereof.

What is claimed is:

1. A marking device for a mould with a wall and a housing therein, comprising:

a threaded cylindrical body with an outside diameter;

a circular head integrally attached to the body and having a diameter about equal to a diameter of the housing and greater than the outside diameter of the body;

the head having a face disposed opposite the body;

the face having a means for turning the head and a marking distinct from the means for turning and independent from a position of the means for turning;

a tapped bush having an outside diameter corresponding to the diameter of the head, the tapped bush corresponding to the threaded cylindrical body, whereby when the body is screwed into the bush the marking device has a circular cylindrical shape; and the head and the body have a combined length that is less than a length of the bush whereby the face of the head is about flush with an internal surface of the wall of the mould when the marking device is disposed in the housing.

2. A marking device, as recited in claim 1, wherein an attachment portion attaches the head to the body, the attachment portion is frustoconical.

3. A marking device, as recited in claim 1, wherein the means for turning the head is a straight slot passing through a center of the face of the head.

4. A marking device, as recited in claim 2, wherein the means for turning the head is a straight slot passing through a center of the face of the head.

* * * * *